US005630537A

United States Patent [19]
Sciacca

[11] Patent Number: 5,630,537
[45] Date of Patent: May 20, 1997

[54] COMPARTMENTALIZED BOX AND KNAPSACK INCORPORATING SAME

[76] Inventor: Vince Sciacca, 180 Widgee Road, Noranda 6062, Western Australia, Australia

[21] Appl. No.: 426,001

[22] Filed: Apr. 20, 1995

[30] Foreign Application Priority Data

Apr. 20, 1994 [AU] Australia .................. PM5214

[51] Int. Cl.$^6$ .................................................. A45F 3/04
[52] U.S. Cl. .................. 224/629; 224/645; 224/920; 220/528; 220/529; 206/561
[58] Field of Search .................... 224/627, 581, 224/629, 630, 645, 920, 209; 220/4.27, 528, 529, 551; 206/561, 315.11, 372, 373

[56] References Cited

U.S. PATENT DOCUMENTS

| | | | |
|---|---|---|---|
| 1,625,920 | 4/1927 | Thurman | 224/920 |
| 2,792,980 | 5/1957 | Brown | 224/629 |
| 4,892,241 | 1/1990 | Mavrakis . | |
| 5,044,537 | 9/1991 | Bufalo | 220/4.27 |
| 5,054,669 | 10/1991 | Zimbardi et al. | 224/920 |
| 5,289,941 | 3/1994 | Blankenburg et al. | 224/528 X |

FOREIGN PATENT DOCUMENTS

| | | | |
|---|---|---|---|
| 30494/77 | 1/1980 | Australia . | |
| 40076/78 | 11/1982 | Australia . | |
| 28765/89 | 7/1989 | Australia | 224/629 X |
| 59081/90 | 4/1991 | Australia . | |

OTHER PUBLICATIONS

Patent Abstract, JP Appln. No. 62–245388, Sep. 28, 1987, Kumagi et al., "Rucksack for Fishing".

Primary Examiner—Renee S. Luebke
Attorney, Agent, or Firm—Larson and Taylor

[57] ABSTRACT

A compartmentized box (20) and a knapsack (10) incorporating same. The knapsack (10) has straps (16) allowing carrying of the compartmentized box (20) on a person's back. The compartmentized box (20) has columns (30) formed of a plurality of panels (23) for supporting a plurality of containers (32) and for allowing the containers (32) to be slid in and out of the compartmentized box (20). Edgewise adjacent ones of the panels (23) can be disconnected from each other and the panels rearranged to allow containers (32) of differing sizes to be slid into the compartmentized box (20) so that the knapsack (10) can be readily restocked with any desired arrangement of the containers (32).

11 Claims, 5 Drawing Sheets

5,630,537

COMPARTMENTALIZED BOX AND KNAPSACK INCORPORATING SAME

FIELD OF THE INVENTION

The present invention relates to a compartmentalized box and a knapsack incorporating same particularly, although not exclusively, envisaged for use in carrying items in a relatively orderly manner.

More particularly, the present invention relates to a knapsack envisaged for dual use, such as, for example, for carrying containers of items in slide draw fashion and further items in loose fashion. The dual use my also be for carrying some items in a box compartment and carrying other items in a bag type compartment.

In the context of the present invention "slide draw fashion" means that the containers can be retrieved one at a time in any order typically by lengthwise sliding of the containers, for example as in sliding draws in a chest of draws. Also, in the context of the present invention "loose fashion" means that the further items are arranged loosely within the knapsack, typically in random arrangement such as would occur in a bag.

BACKGROUND OF THE INVENTION

When embarking to a location to catch fish it is common to carry a fishing rod, a tackle box for carrying fishing tackle, and a coolbox for storing food and/or drink. The tackle box has a plurality of separate containers for storing separate items of tackle. Typically, the fishing rod and the tackle box are carried in one hand and the coolbox in the other. A disadvantage of such arrangement is that the fisherman has no hand free to assist in climbing or the like which may be necessary to reach the location for fishing. It is more desirable for the fisherman to be able to carry the tackle box on his/her back. For example, a conventional knapsack could be used. However, in such a case containers must still be used in order to store the separate items of tackle without tangling with each other. The containers for the tackle can be easily stored but can not be easily retrieved from the conventional knapsack and so the ease of carrying is lost to the difficulty of locating a required container and retrieving it. The problem is that the conventional knapsack is too flexible and does not readily allow orderly arrangement of the containers for convenient retrieval.

Prior art knapsacks are typified by Australian Patent Application Nos. 59081/90 (Mahvi et. al.) and 28765/89 (Falletta et. al.) and Australian Patents Nos. 525380 (Brunton) and 506560 (Essl). Mahvi et. al. disclose a multipurpose travel bag capable of being hand carried or worn as a back pack. The travel bag has a plurality of compartments, some of which are removable and all of which are intended for differing uses. Falletta et. al. disclose an amphibious backpack intended for use under water for "submarine trekking". The backpack has a plurality of compartments two of which can be removed. Some of the compartments are water proof and some and designed to fill with water to provide buoyancy compensation. Brunton discloses a traveller's pack intended to facilitate easier packing and unpacking of items and allowing for easier accounting of the items. Various compartments of the pack connect together with zippers to form an assembled pack from a collection of discrete compartments. Essl discloses a backpack such as a briefcase which can be carried on shoulder straps. The backpack has a stiffening insert over which is fitted a flexible outer covering.

None of the prior art knapsacks discloses a framework for removably retaining a plurality of containers in fixed relation to each other. Also, the prior art knapsacks all suffer the disadvantage that a plurality of items must be unpacked to gain access to a desired item.

It is therefore more desirable to provide a knapsack having a plurality of slide draws to allow for easy access to all containers of tackle in the knapsack. The slide draws provide a relatively rigid framework for orderly arrangement of the containers in fixed relation with respect to each other when stored. Thus, the facility for the user to carry the knapsack upon his/her back avoids the need for the user to carry a tackle box in one hand. Also, the slide draws avoid the problems of identification and retrieval of containers from the knapsack.

It is also or alternatively desirable to provide a coolbox in the knapsack to obviate the need for the user to use one of his/her hands to carry a separate coolbox.

SUMMARY OF THE INVENTION

It is therefore an object of the present invention to provide a compartmentalized box for relatively orderly storage of items.

In accordance with one aspect of the present invention there is provided a compartmentalized box comprising:

- a receptacle formed of a top wall, a bottom wall and a plurality of side walls, one of the side walls being moveable to allow access into the receptacle;
- a plurality of containers removably locatable within the receptacle, each container being capable of containing items to be stored; and,
- a plurality of columns extending between the bottom wall and the top wall, the columns each being formed of a plurality of panels located one atop the other, each panel having a shoulder so that the shoulders of panels of adjacent columns align horizontally so that the containers can be slid in and out of the receptacle along the shoulders through the moveable side wall, the panels being able to be removed and rearranged to vary the location of the columns and the location of the shoulders so that the plurality of containers can be rearranged in the receptacle and containers of differing sizes placed in the receptacle.

It is therefore another object of the present invention to provide a knapsack having a substantially rigid means for relatively orderly storage of items.

In accordance with another aspect of the present invention there is provided a knapsack comprising:

- a receptacle formed of a top wall, a bottom wall and a plurality of side walls, one of the side walls being moveable to allow access into the receptacle;
- a plurality of containers removably locatable within the receptacle, each container being capable of containing items to be stored;
- a plurality of columns extending between the bottom wall and the top wall, the columns each being formed of a plurality of panels located one atop the other, each panel having a shoulder so that the shoulders of panels of adjacent columns align horizontally so that the containers can be slid in and out of the receptacle along the shoulders through the moveable side wall, the panels being able to be removed and rearranged to vary the location of the columns and the location of the shoulders so that the plurality of containers can be rearranged in the receptacle and containers of differing sizes placed in the receptacle; and,
- a strap means coupled to the compartmentalized box for allowing carrying on a person's back.

Preferably, the knapsack also has a bag, the bag housing or attached to the compartmentised box.

Typically, the moveable side wall is a door located in a side of the bag. The door may be padded and arranged to bear against the person's back when the knapsack is being carried. In such a case the containers are typically disposed horizontally.

Preferably, the bag is relatively flexible and has pockets and pouches in similar manner to a conventional knapsack.

Preferably, the door of the retaining means is rigid.

In one form the compartmentalized box is in the form of a coolbox for storage of items being foods or drinks. Alternatively, the compartmentalized box could include a coolbox.

Preferably, the compartmentalized box is located in the bottom of the knapsack so as to provide a relatively flat base for standing the knapsack on the ground or a table or the like.

The moveable wall could include a plurality of doors. Typically, the doors are hinged to the receptacle.

The knapsack of the present invention will hereinafter be described with particular reference to adaptation for use in carrying fishing tackle, although it is to be understood that it is of general applicability. For example, the knapsack could be adapted for use to carry food and/or drink, or for carrying hunters requisites or the like where relatively orderly storage and easy retrieval of items is desired.

Hereinafter, the term "receptacle" shall be used in place of the term compartmentalized box.

BRIEF DESCRIPTION OF THE DRAWINGS

Exemplary embodiments of the present invention will now be described with reference to the accompanying drawings, which.

DESCRIPTION OF THE PREFERRED EMBODIMENT

Figure 1:
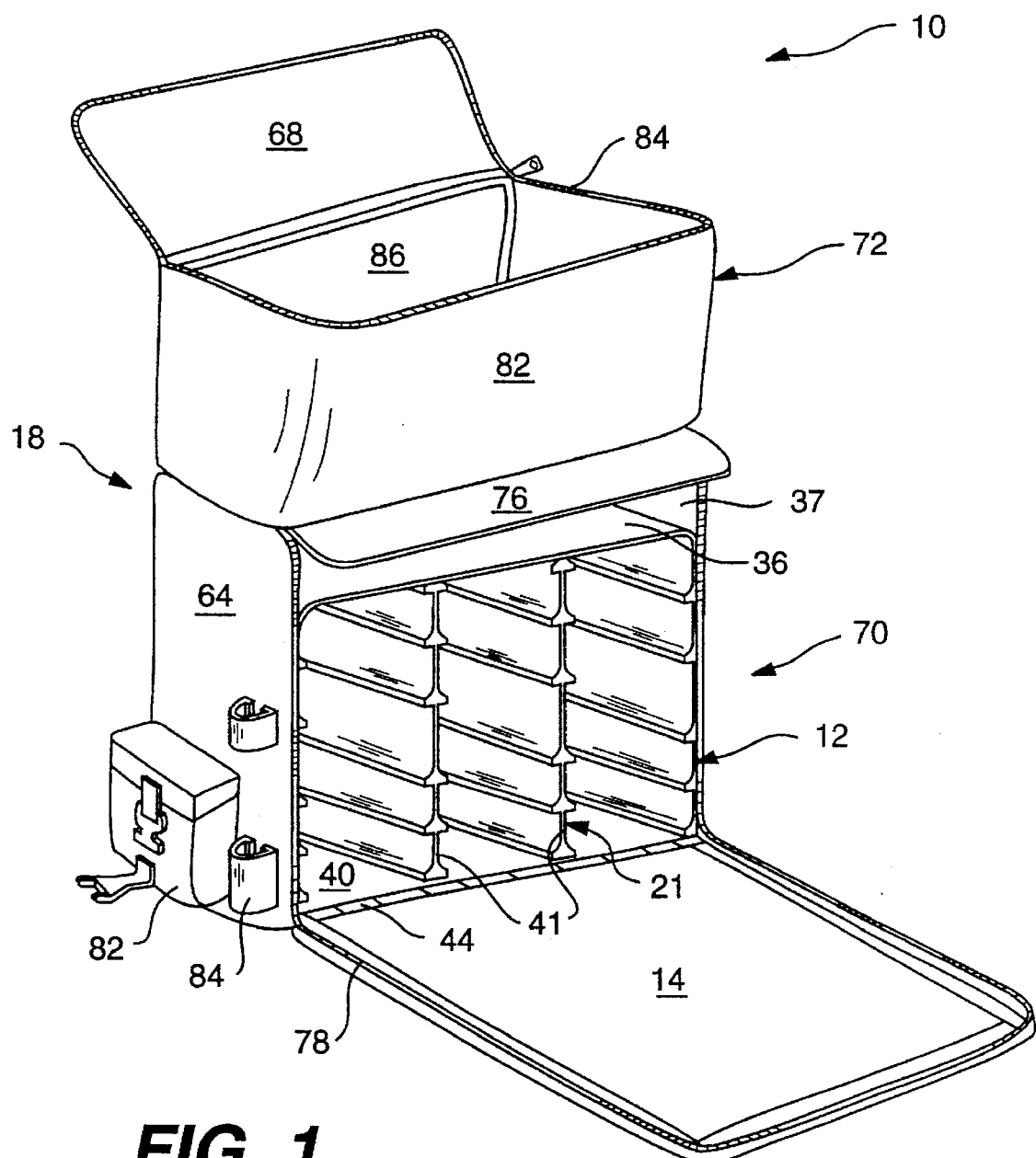
FIG. 1 is a perspective view, seen from above, of a knapsack particularly adapted for carrying fishing tackle, shown in an open condition.
Figure 2:
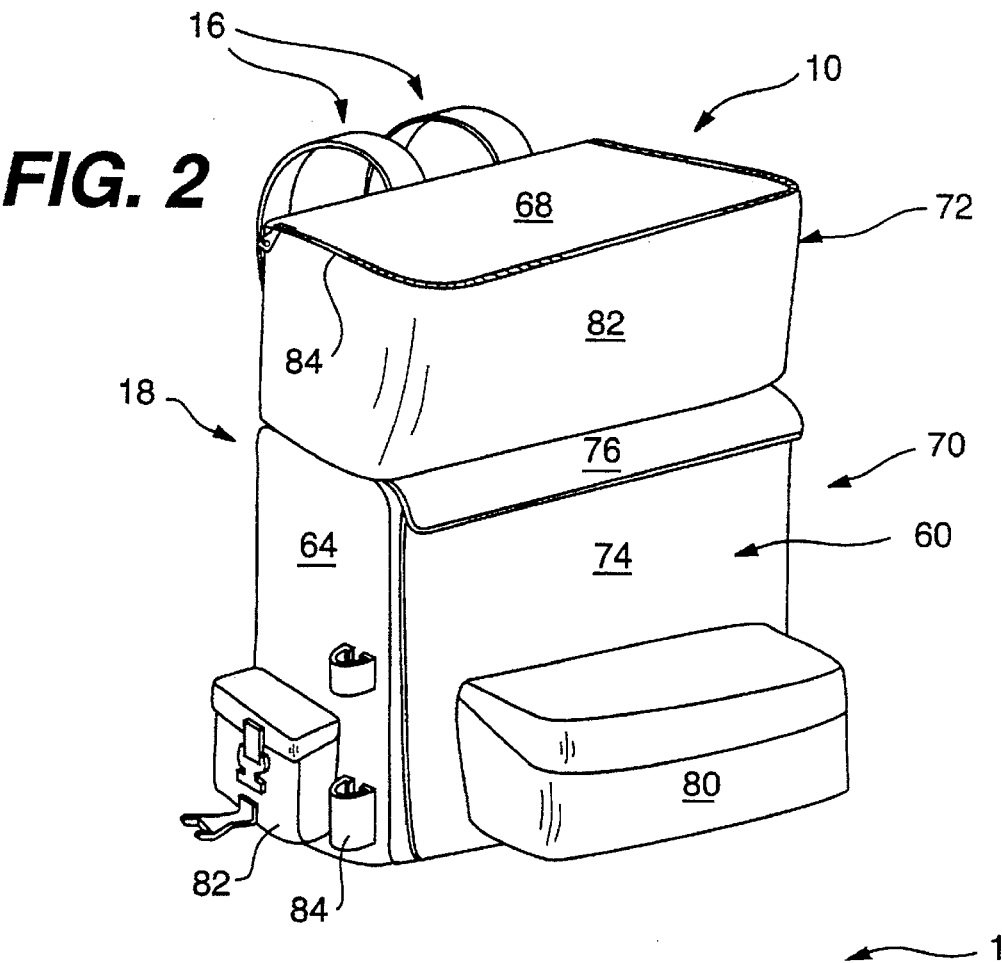
FIG. 2 is a perspective view of a knapsack of FIG. 1, shown in a closed position.

In FIGS. 1 and 2 there is shown a knapsack 10 comprising a receptacle 12, a door 14, two shoulder straps 16 and a bag 18.

Figure 4:
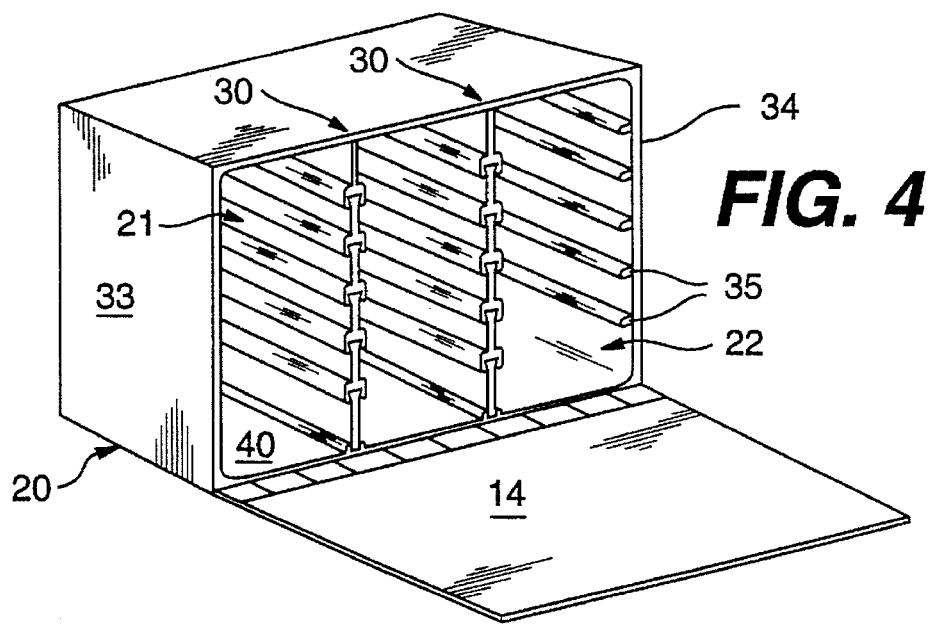
FIG. 4 is a perspective view of a receptacle of the knapsack of FIG. 1, the receptacle being shown removed from the knapsack.

The receptacle 12 is conveniently in the form of a relatively rigid box 20 incorporating a framework 21 and having an open side 22 (see FIG. 4).

Figure 5:
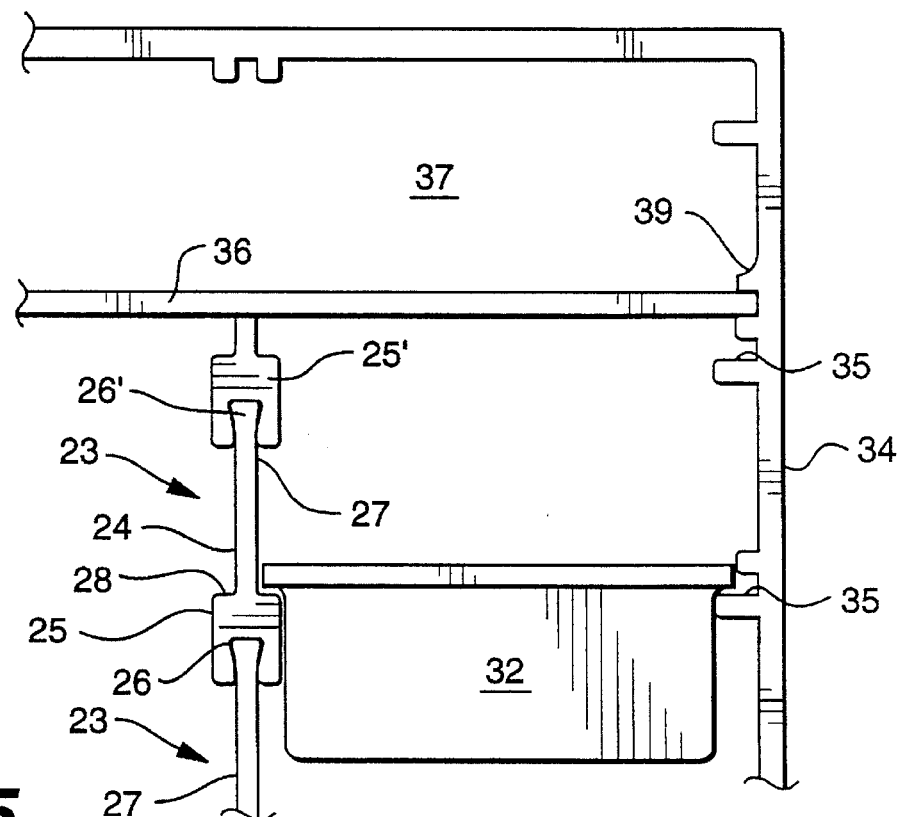
FIG. 5 is a part front view of the receptacle of FIG. 4 showing its framework and the container of FIG. 1A; and, FIGS. 6 and 7 are front views of the receptacle of FIG. 4, showing two of many options for arrangement of its panels and containers.

As shown in FIGS. 1, 4 and 5 the framework 21 has a plurality of panels 23 each being vertically interlockable with similar edgewise adjacent panels 23. Each panel 23 typically has a lower edge 24 at which is located an enlarged portion 25 (see FIG. 5) with a channel 26 into which an upper edge 27 of one of the edgewise adjacent panels 23 is received. The channel 26 is typically tapered towards its opening and the upper edge 27 is flared complementary to the channel 26. Accordingly, the upper edge 27 of one of the panels 23 can be slid lengthwise into secure engagement witch the lower edge 24 of an edgewise adjacent one of the panels 23 and inhibited from edgewise separation of the said panel 23. Each enlarged portion 25 has two lengthwise extending upper shoulders 28 located on opposite sides of the panel 23.

A plurality of columns 30 are formed from the panels 23. The columns are disposed substantially vertically in the box 20. The shoulders 28 of the panels 23 of adjacent ones of the columns 30 are disposed at the same height so as to receive a container 32 (see FIG. 1A) as shown in FIG. 5. Opposing side walls 33 and 34 of the box 20 also have shoulders 35 at heights corresponding to the heights of the shoulders 28 of the panels 23 for supporting containers 32 between the columns 30 and the walls 33 and 34. The shoulders 28 and 35 allow for sliding movement of the containers 32 into and out of the box 20 in slide draw fashion.

As shown in FIG. 5 an upper most one of the panels 23 of each of the columns 30 typically engages with a baffle 36 disposed between the side walls 33 and 34. The baffle 36 defines a chamber 37 which extends between the side walls 33 and 34. The baffle 36 has a plurality of beads 25' spaced along it, each with a channel 26'; similar to the beads 25 and the channels 26. The channels 26' receive the upper edge 27 of the upper most panels 23 of the each of the columns 30. The side walls 33 and 34 have a stop 39 for holding the baffle 36 in engagement with the columns 30. The box 20 also has a base 40 which has a plurality of ribs 41 similar to the upper ends 27 of the panels 23, for supporting the columns 30.

Figure 1A:
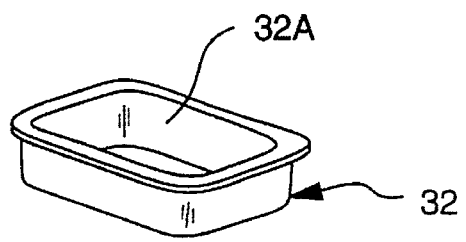
FIG. 1A is a perspective view, seen from above, of a container for use in the knapsack of FIG. 1.

As shown in FIG. 1A the container 32 typically has an integral lid 32A for closing it off. Each of the containers 32 may also have a hand grip to enable easy sliding of the container in and out of the box 20. Preferably, the container 32 can be removed from the box 20, such as for retrieving the contents of the container 32or for substitution or replacement of the container 32 with another container 32 having different contents or of different size.

As shown in FIGS. 1 and 4 the door 14 is typically rigid and attached by a hinge 44 to the box 20 for closing the open side 22. The door 14 is pivotable between a first position, wherein it closes the open side 22 and a second position, wherein it allows access into the box 20 via the open side 22.

Typically, the door 14 is of complementary shape to the open side 22. In another embodiment the door 14 is flexible and is padded so as to be suitable for bearing against the back of a person carrying the knapsack 10 upon their back.

Figure 3:
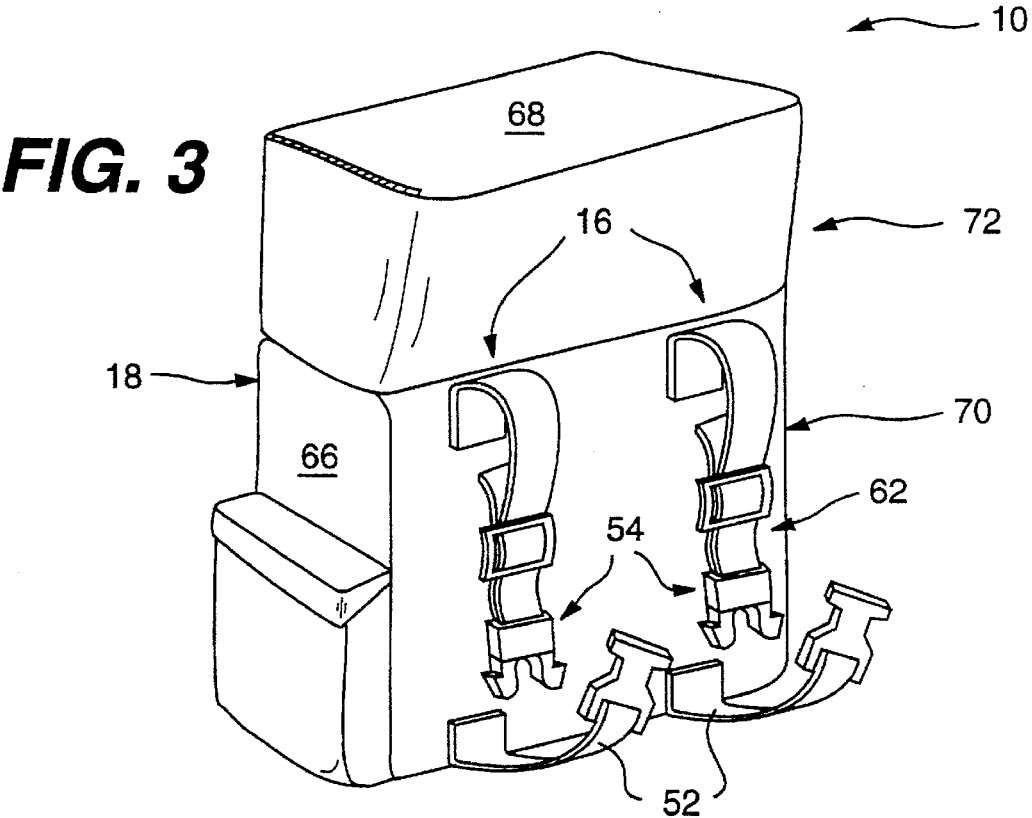
FIG. 3 is a perspective view of the knapsack of FIG. 1, shown from the rear.

Particularly as shown in FIGS. 2 and 3 the two straps 16 are elongate and are typically made from web material. The straps 16 are secured to the bag 18 at a first end 50 and at a second end 52. Preferably, the straps 16 include adjustors 53 for adjusting their length to suit user's of different build, and quick release clips 54 for rapid removal of the knapsack 10 from the user's back.

As shown in FIGS. 1, 2 and 3 the bag 18 has a front 60, a back 62, two sides 64 and 66 and a lid 68. The bag 18 is formed into a lower compartment 70 and an upper compartment 72. The lower compartment 70 is shaped to receive the box 20 and the lower compartment has a door flap 74 and a weather flap 76 for the installation of the box 20 therethrough. The door 14 of the box 20 registers with the door flap 74 and the weather flap 76 is disposed over an upper edge of the door flap 74 so as to inhibit the ingress of water and the like into the lower compartment 70. Typically, the door flap 74 is fixed to the door 14 so that both open and close together. The door flap 74 has a zipper 78 which has one edge attached to the door flap 74 and its other edge attached to the sides 64 and 66 and below the weather flap 76. The zipper 78 can be unzipped to allow pivoting of the door flap 74 downwardly to allow hinging of the door 14 to reveal the open side 22 of the box 20. The zipper 78 typically ham two zipper heads (not shown) which meet below the weather flap 76. The door flap 74 typically also has a pouch 80 for receiving loose items. A further pouch 82 is attached to the side 64 proximate an umbrella holder 84. The upper compartment 72 has an endless wall 82 which is closed off by the lid 68. A zipper 84 is provided to seal the lid 68 against the endless wall 82. The upper compartment 72 defines a recess 86 for the receipt of loose articles. The bag 18 has a membrane (not shown) fixed about a lower edge of the endless wall 82 for defining the base of the upper compartment 72 and the top of the lower compartment 70.

In use, items of, for example, fishing tackle are stored in the containers 32. The containers 32 are then slid in slide draw fashion into the receptacle 12. The lower most containers 32 slide along a base 40 of the box 20 and the other containers 32 slide along respective pairs of the shoulders 28 and 35. Any one of the containers 32 may be removed by grasping the container and sliding it out of the box 20.

The containers 32 can be secured into the box 20 by closing the door 14 to close off the open side 22. The door 14 is secured to the box 20 by closing the zipper 78. Other items may be placed in the upper compartment 72 or the pouches 80 and 82 in known manner.

A person can then carry the knapsack 10 by placing his/her arms through the shoulder straps 16 so that the back 62 rests against his/her back in conventional manner. The person thus has his/her hands free for carrying other items such as a fishing rod and/or coolbox or the like.

Upon reaching a desired destination the knapsack 10 can be removed by the person removing his/her arms from the shoulder straps 16 and placing/setting the knapsack 10 upright upon the ground. The door 14 can then be opened for retrieving the containers 32, and the upper chamber 54 and the pouches 80 and 82 can be opened to retrieve other items.

Figure 6:
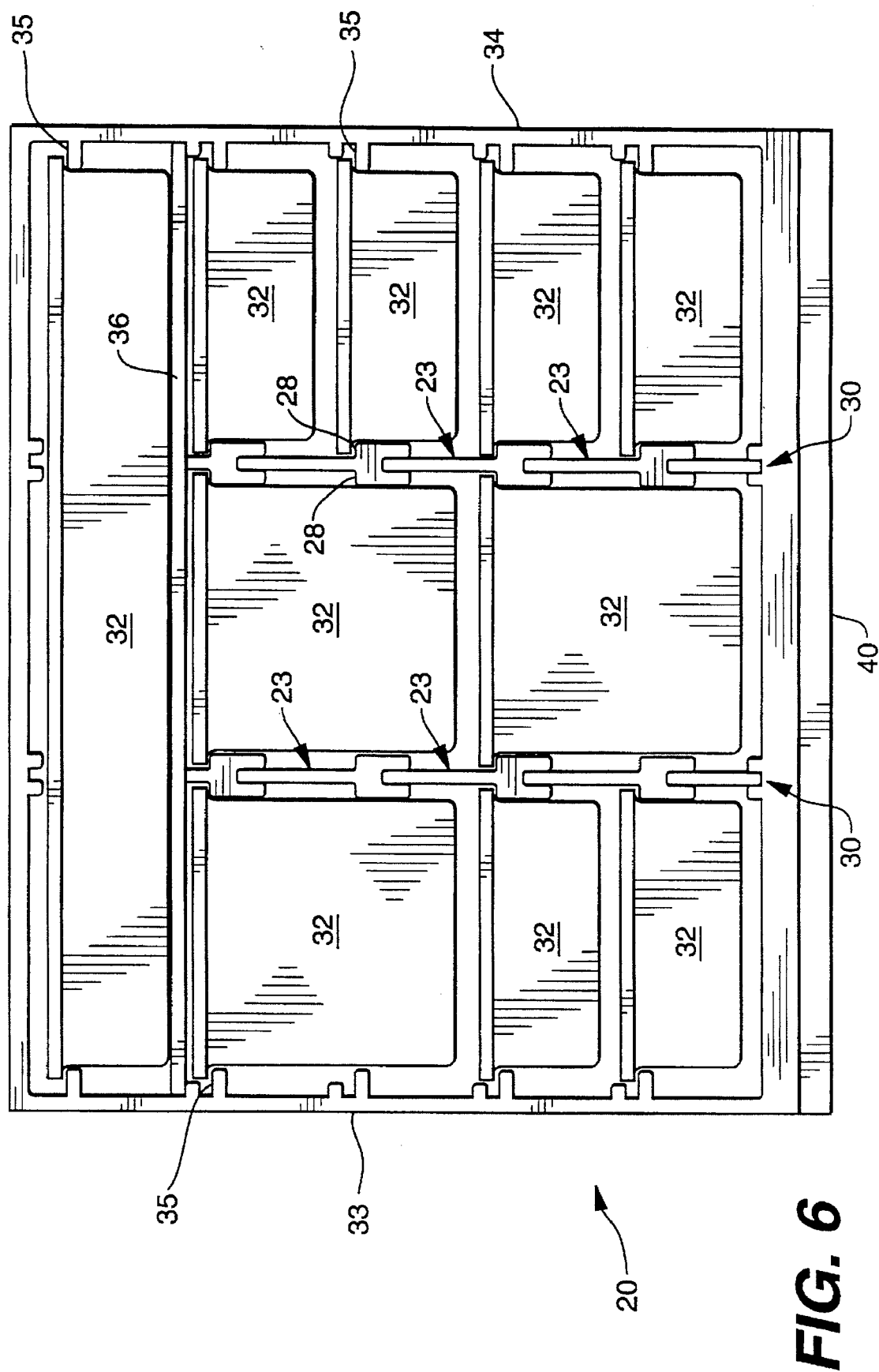
Figure 7:
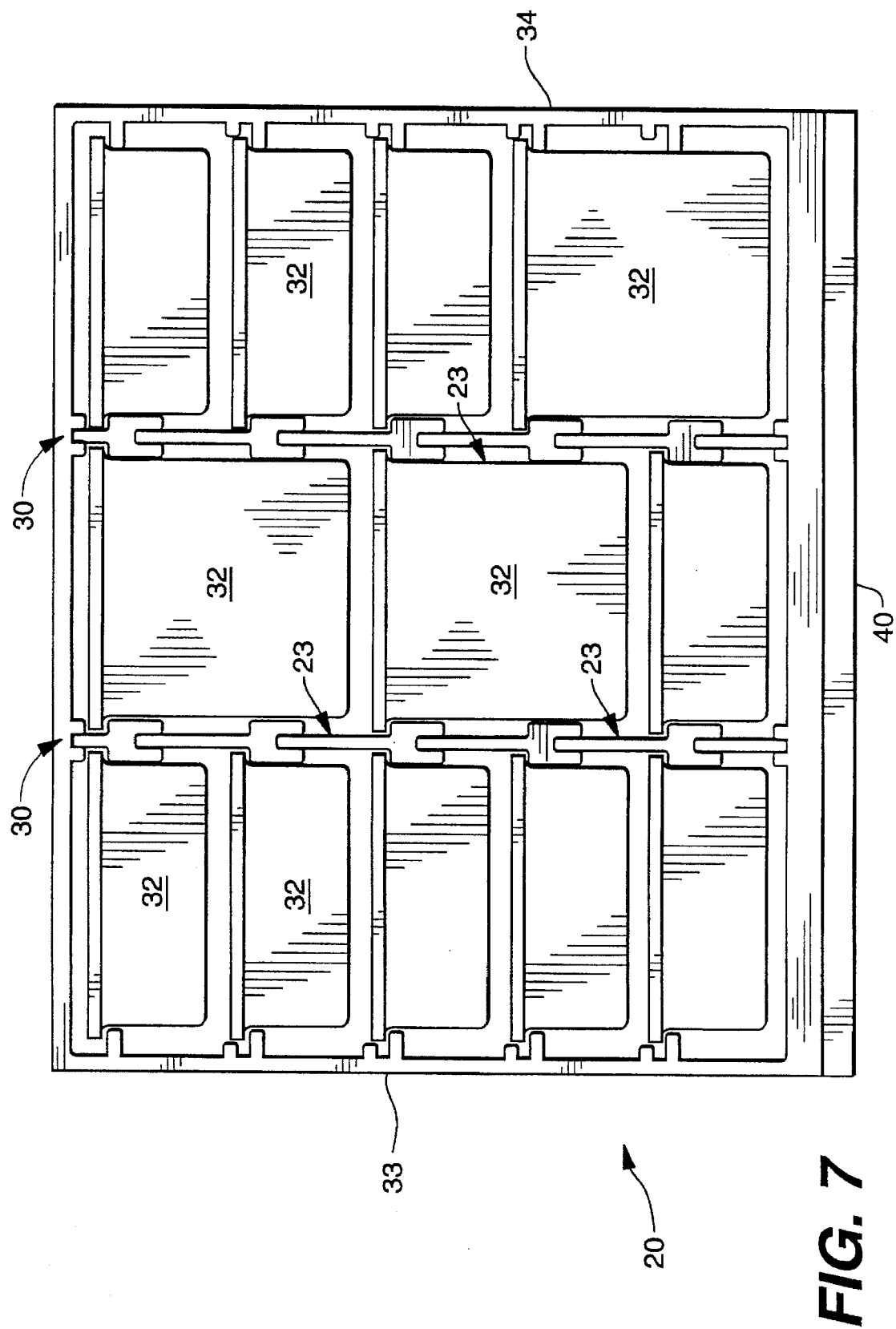

The interior of the box 20 can be rearranged by altering the number of columns 30 and the arrangement of the panels 23 in each column 30 (where the panels 23 in one of the columns 30 are of differing heights. Hence, the size of the chamber 37 can be adjusted and containers 32 of differing sizes can be accommodated, as shown in FIGS. 6 and 7.

The knapsack 10, of the present invention has the advantage that it enables items that desirably are stored in containers 32 to be carried on a user's back and allows easy identification of the containers 32 and ready independent removal of any one or more of the containers 32. Thus, excellent storage for small items, such as, for example, fish hooks, lures, sinkers and the like, is provided. The knapsack 10 has the further advantage that the box 20 serves as a stable base for standing the knapsack 10 upright on a surface. Also, the knapsack 10 avoids the need for the user to carry a separate tackle box in one of his or her hands and thus allows other items to be carried, or use of the hand in scaling rocks and the like to arrive at the desired destination. Further, by the removal and/or adjustment of the columns 30 containers 32 of differing sizes can be accommodated and/or coolboxes added.

The knapsack 10 has the further advantage that where the box 20 is or includes a coolbox the user's hands are freed for use in other tasks as described previously.

Modifications and variations such as would be apparent to a skilled addressee are considered within the scope of the present invention. For example, the knapsack 10 could comprise only the box 20 and the shoulder straps 16 i.e. the bag 18 could be omitted. Also, the box 20 could be flexible provided a rigid framework is provided for the shoulders 28 and 35. The straps 16 could be disposed on the front 60 of the knapsack 10. Also, the box 20 could be devoid of the shoulders 28 and 35 and/or the columns 30. Further, the open side 22 could be closed by a plurality of doors. For example, one door could be provided for each container 32. Also, the open side 22 could be located in other sides of the box 20. Further, the shoulder 28 and 38 could be extended laterally to form shelves and the containers 32 could be open topped such that the shelves close off the top of the containers 32. Still further, the containers 32 could be provided with labels to indicate the nature of the items they contain. Still further, clips could be provided for securing each container 32 individually into the box 20. Still further, the ends 52 of the straps 16 could be secured to the box 20. Still further, the panels 23 could have differing heights so that the shoulders 28 can be arranged at differing heights in the receptacle 20 for accommodating containers 32 of differing sizes.

I claim:

1. A compartmentalized box comprising:
   a receptacle formed of a top wall, a bottom wall and a plurality of side walls, one of the side walls being moveable to allow access into the receptacle;
   a plurality of containers removably locatable within the receptacle, each container being capable of containing items to be stored; and,
   a plurality of columns extending between the bottom wall and the top wall, the columns each being formed of a plurality of panels located one atop the other, each panel having a shoulder so that the shoulders of panels of adjacent columns align horizontally so that the containers can be slid in and out of the receptacle along the shoulders through the moveable side wall, the panels being able to be removed and rearranged to vary the location of the shoulders so that the plurality of containers can be rearranged in the receptacle and containers of differing sizes placed in the receptacle.

2. A compartmentalized box according to claim 1, in which each of the panels has a first edge and a second edge located opposite from the first edge, the second edge having a connector means for receiving the first edge of an edgewise adjacent one of the panels in one of the columns.

3. A compartmentalized box according to claim 2, in which the connector means is an elongate enlarged portion extending along an longitudinal edge of each of the panels, the elongate bead having a channel which is of complimentary shape to the first edge of the said edgewise adjacent panel.

4. A compartmentalized box according to claim 2, in which the first edges of the panels flare outwardly and the second edges each have an elongate enlarged portion with a channel which is tapered inwardly so that the first edge of one of the panels can be slid into the channel of an edgewise adjacent one of the panels for connecting the edgewise adjacent panels together.

5. A compartmentalized box according to claim 2, in which each of the connector means defines at least one of the shoulders upon which the containers can be slid.

6. A compartmentalized box according to claim 2, also having a baffle extending across at least one of the columns, the baffle having means for receiving the first edge of the panels for terminating one end of the at least one of the columns, and the baffle defining a recess for receiving a container which is wider than the space spanned by two adjacent ones of the columns.

7. A knapsack having a compartmentalized box and a strap means, the compartmentalized box comprising:

a receptacle formed of a top wall, a bottom wall and a plurality of side walls, one of the side walls being moveable to allow access into the receptacle;

a plurality of containers removably locatable within the receptacle, each container being capable of containing items to be stored;

a plurality of columns extending between the bottom wall and the top wall, the columns each being formed of a plurality of panels located one atop the other, each panel having a shoulder so that the shoulders of panels of adjacent columns align horizontally so that the containers can be slid in and out of the receptacle along the shoulders through the moveable side wall, the panels being able to be removed and rearranged to vary the location of the columns and the location of the shoulders so that the plurality of containers can be rearranged in the receptacle and containers of differing sizes placed in the receptacle; and, the strap means being coupled to the compartmentalized box for allowing carrying on a person's back.

8. A knapsack according to claim 7, in which each of the panels has a first edge and a second edge located opposite from the first edge, the second edge having a connector means for receiving the first edge of an edgewise adjacent one of the panels in one of the columns.

9. A knapsack according to claim 8, in which the connector means is an elongate enlarged portion extending along an longitudinal edge of each of the panels, the elongate enlarged portion having a channel which is of complimentary shape to the first edge of the said edgewise adjacent panel.

10. A knapsack according to claim 8, in which the first edges of the panels flare outwardly and the second edges each have an elongate enlarged portion with a channel which is tapered inwardly so that the first edge of one of the panels can be slid into the channel of an edgewise adjacent one of the panels for connecting the edgewise adjacent panels together.

11. A knapsack according to claim 8, in which each of the connector means defines at least one of the shoulders upon which the containers can be slid.

* * * * *